INVENTOR
Otto H. Brandi

United States Patent Office 3,199,432
Patented Aug. 10, 1965

3,199,432
APPARATUS FOR SUPPLYING CONDITIONED AIR AT A PREDETERMINED OVER-PRESSURE TO A ROOM FROM A CORRIDOR
Otto Heinz Brandi, 34–42 Kolner Strasse, Frechen-Marsdorf, near Cologne, Germany
Filed Dec. 26, 1962, Ser. No. 247,030
Claims priority, application Germany, Dec. 30, 1961, B 65,388
6 Claims. (Cl. 98—33)

This invention relates to apparatus for the supply of rooms with conditioned air.

It is known to provide inner rooms with conditioned air for heating, cooling, aerating and ventilating these rooms and to withdraw the used air from the rooms, preferably at the windows. The conditioned air is supplied by closed channels which extend in a corridor, preferably at the ceiling thereof. Depending on the number of the connected rooms, the channels for the conditioned air are provided with branch conduits with graded cross-sections. The grading is dependent on the location of the central supply channel as well as on the air required by the rooms to be air conditioned. If the air and heat requirement of these rooms is often changing, it is relatively difficult to effect a compensation of air flow in view of the fixed cross-sections of the branch conduits. In a branched channel system only average values of the air and heat requirement may be calculated and fixed for a suitable pressure distribution within the channel system so that the amounts of air of the individual sections and branches remain nearly constant even with varying outer pressure conditions.

The invention has for its object an apparatus for the supplying of conditioned air to rooms connected to a stable withdrawal system. According to the invention, the conditioned air to be supplied to the inner rooms is delivered directly into the free space of the corridor which serves as a supply means for the conditioned air. The corridor is kept flooded by the conditioned air under over-pressure to insure that the volume of air withdrawn from the rooms is replaced by air flowing from the corridor into the rooms. A limited amount of conditioned air is separately supplied to the rooms from the corridor flooded. Besides the connection with the corridor flooded with conditioned air a further channel system, which is operated for heating or cooling with conditioned air at higher or lower temperatures. The absolute pressure of this conditioned air is higher than the pressure within the flooded corridor so that for heating or cooling purposes each room may take from this channel system air with a higher or lower temperature, depending on whether heating or cooling is being effected to obtain a desired temperature in the room. The remaining necessary share of conditioned air flows into the room from the corridor. In this manner an increase of the heating or cooling effects and the possibility of an individual control of the temperature of a room is obtained. In view of the small pressures involved in the use of conditioned air, the influence on the channel system for used air is kept within negligible small limits. For this reason, the change of air of the connected rooms remains practically constant, irrespective of how much air is derived from the fixedly connected channel system for conditioned air.

Over the know arrangements with one channel there is obtained a simplification and reduction of costs of the channel system for conditioned air because only one supply channel for a partial amount of air is required for the control of temperature. The adjustment is simpler since only the channel system for used air must be precisely adjusted to the change discharged from used air of the connected rooms. Further, there results a simple local control of temperature by a flap or damper without subsequent heat exchangers and water conduits.

Over the know arrangements with two channels, there is obtained a simpler and cheaper channel system for conditioned air because only one supply channel for a partial amount of air is required for the control of temperature. Further, the costly mixing chambers are eliminated. According to the invention, there may be effected a suitable supply of control air at a higher temperature with the use of injection for mixing with conditioned air from the corridor and/or with the used air of the room for obtaining an adjustment of the blowing temperature to the temperature of the room. Costly volume gauges susceptible to trouble are eliminated since in view of the small counter pressures of the flooded corridor, even with variable amounts of controlled air, the influence on the channel system for used air is negligibly small. The influence is also immaterially small if the controlled air is supplied with high velocity and high pressure for the purpose of reducing the size of the channel system. Operating costs may be saved by lowering the supply pressure.

Compared with heating or cooling of the room by supply of conditioned air from the flooded corridor, the device according to the invention enables a more efficient and rapid control of the room temperature independent from adjacent rooms. The supply of additional air with a higher or lower temperature besides heating of the room with conditioned air from the flooded corridor enables a more rapid and efficient change of the temperature in the room than with heat exchangers arranged in the room for heating or cooling purposes. Larger heating or cooling effects are further obtained, resulting in a larger range of application than with the usual apparatus.

The conditioned air supplied to the corridor has to form the main part of the whole conditioned air. This means that this air, which is dependent on the outside temperature, has to be cooled in the summer and to be heated in the winter to such an extent as is required for a particular room. The air directly supplied to the rooms by the closed channel system suitably has to form only a small part of the required change of air. In view of its higher heating or cooling effect, it makes possible an individual control of the temperature of a room and supplies the heating and cooling requirements at peak loads. The additional channel system required by the instant invention may, therefore, be kept very small.

The volume of conditioned air supplied by the separate channel system to each room may be varied by a manually operated or automatic adjusting device to control the temperature of the room. The control of the temperature of conditioned air supplied from the corridor is advantageously effected in accordance with the outside temperature. The control of the temperature of conditioned air supplied by the additonal channel system, that is, the control air, is suitably effected in accordance with the amount of derived air in such a manner that with an increasing amount of air the difference between the desired value of the temperature in the room and the temperature of the control air is increased.

With the above and other objects in view that will hereinafter appear, the nature of the invention will be more clearly understood by reference to the following detailed description, the appended claims and the several views illustrated in the accompanying drawing.

Figure 1:
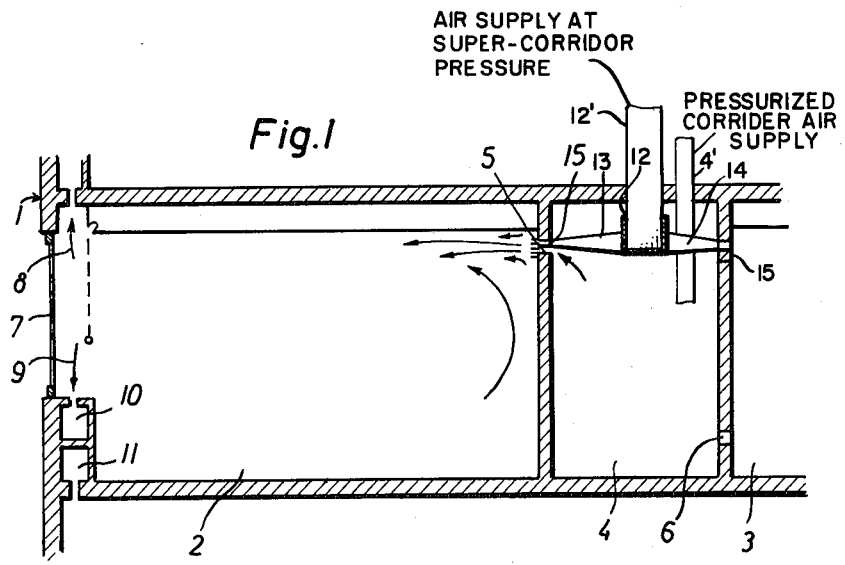
FIG. 1 is a vertical section of building rooms to be supplied with conditioned air according to the invention.

Referring now to the drawing in detail, it will be seen that there is shown a building, which is generally referred to by the numeral 1, of which a cutaway portion of a floor is illustrated. The building 1 has rooms 2 and 3 which are arranged on opposite sides of a corridor 4. This corridor is kept flooded, by a duct 4', with conditioned air under a certain overpressure. Passages 5 and 6 lead from the corridor into the rooms 2 and 3, respectively. The room 2 has a window 7 at which there is effected a permanent withdrawal of used air in an upward and/or downward direction, according to arrows 8 and 9, to discharge channels 10 and/or 11, respectively. Air is similarly removed adjacent a window 7', located in room 3, as indicated by the arrow 8'. The numeral 12 designates an additional supply channel for conditioned air by which control air of a higher or lower temperature is supplied for heating or cooling purposes, respectively. Air is supplied to the channel 12 by a duct 12'. From the supply channel 12 are branched individual conduits 13 and 14 which are connected by separate passages 15 with the room to be supplied with conditioned air. The additional control air is advantageously introduced into the room at high speeds, in this manner conditioned air from the flooded corridor 4 and used air is entrained into the depth of the room.

Figure 2:
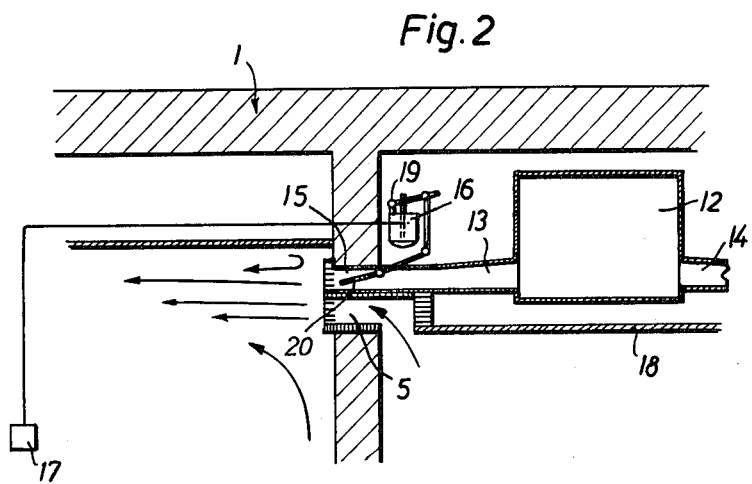
FIG. 2 is a vertical sectional view on a larger scale and shows the apparatus for flooding the corridor with additional control air.
Figure 3:
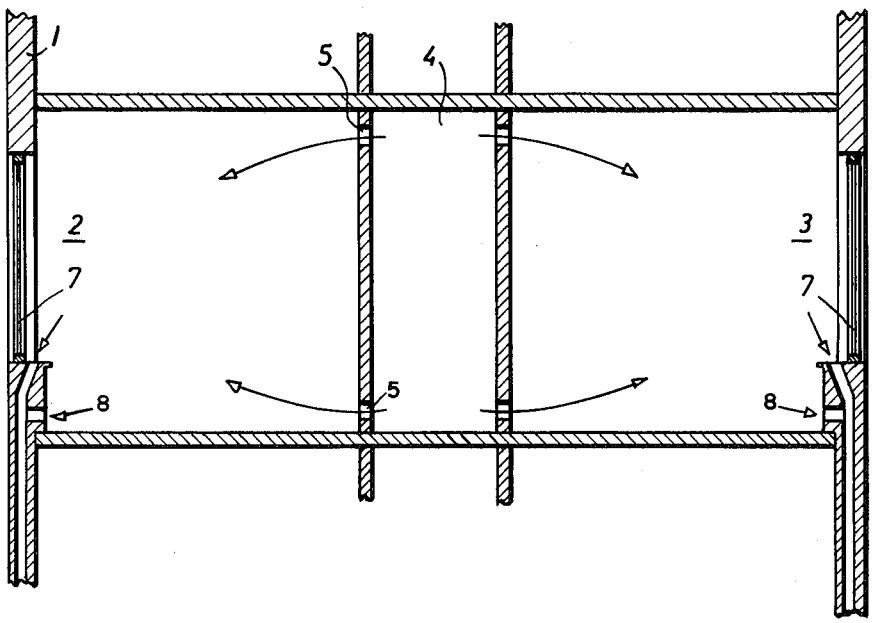
FIG. 3 is a vertical sectional view of rooms separated by a corridor, and shows an arrangement of channels for distributing conditioned air from the corridor into and out of the rooms.

In the passage 15 a device for adjusting the amount of control air may be located in the channel 12. To this end a flap or damper 20 is positioned within the conduit 13 and operated by a motor 16 through linkage 19. The motor is actuated by impulses transferred from a room thermostat 17. The supply channel 12 for the control air may be arranged unconcealed in the flooded corridor 4. The corridor and the rooms may also be provided with a suspended ceiling 18, as is shown in FIG. 2, so that the supply channel 12 is masked in the corridor. The supply channels for the two currents of conditioned air are suitably provided with a sound-absorbing lining (not shown).

From the foregoing, it will be seen that novel and advantageous provision has been made for carrying out the desired end. However, attention is again directed to the fact that variations may be made in the example and apparatus disclosed herein without departing from the spirit and scope of the invention, as defined in the appended claims.

What is claimed is:

1. An apparatus for supplying conditioned air comprising a room, a corridor, means for supplying conditioned air at a predetermined over-pressure to the corridor, means for supplying the conditioned air from the corridor into the room, additional means for supplying the room with a limited amount of control-conditioned air at a pressure above the corridor pressure, and means for withdrawing air from the room.

2. The apparatus as defined in claim 1 wherein said additional means includes damper means for controlling the amount of control air supplied from the corridor into the room.

3. The apparatus as defined in claim 1 wherein said additional means includes a channel system, and said channel system includes a conduit opening into said room.

4. The apparatus as defined in claim 1 wherein said additional means includes a channel system, said channel system including a conduit opening into said room, and means for adjustably regulating the amount of control air supplied to said room through said conduit.

5. The apparatus as defined in claim 4 wherein said regulating means includes a damper and means for regulating the position of said damper relative to said conduit.

6. The apparatus as defined in claim 5 wherein said regulating means includes a motor, means connecting said motor to said damper, and thermal responsive means in said room connected to said motor whereby said damper is operated by said motor in response to said thermal responsive means to vary the amount of control air supplied said room.

References Cited by the Examiner

UNITED STATES PATENTS

| 1,303,210 | 5/19 | Klein | 98—33 |
| 1,832,638 | 11/31 | Kitchen | 98—33 |
| 2,224,407 | 12/40 | Passur | 98—33 |
| 2,737,875 | 3/56 | Kurth | 98—38 |

ROBERT A. O'LEARY, *Primary Examiner.*

MEYER PERLIN, *Examiner.*